United States Patent
Lee (10) Patent No.: US 9,052,538 B2
(45) Date of Patent: Jun. 9, 2015

(54) LIQUID CRYSTAL DISPLAY DEVICE

(71) Applicant: LG Display Co., Ltd., Seoul (KR)

(72) Inventor: Ju-Young Lee, Gyeonggi-Do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 13/727,956

(22) Filed: Dec. 27, 2012

(65) Prior Publication Data

US 2013/0286316 A1     Oct. 31, 2013

(30) Foreign Application Priority Data

Apr. 25, 2012    (KR) ........................ 10-2012-0043420

(51) Int. Cl.
    *G09G 5/00*           (2006.01)
    *G02F 1/133*         (2006.01)
    *G09G 3/36*           (2006.01)

(52) U.S. Cl.
    CPC .......... *G02F 1/13306* (2013.01); *G09G 3/3677* (2013.01); *G09G 3/3696* (2013.01); *G09G 2300/0426* (2013.01); *G09G 2310/0281* (2013.01); *G09G 2310/0286* (2013.01); *G09G 2310/08* (2013.01)

(58) Field of Classification Search
    CPC ............... G09G 2310/0281; G09G 2310/0286
    USPC ........................................................ 345/204
    See application file for complete search history.

(56) References Cited

U.S. PATENT DOCUMENTS

| 2004/0041774 A1 | 3/2004 | Moon |
| 2007/0105318 A1 | 5/2007 | Jeon et al. |
| 2009/0021466 A1 | 1/2009 | Otose et al. |
| 2010/0007635 A1 | 1/2010 | Kwon et al. |
| 2010/0238143 A1* | 9/2010 | Liu et al. ...................... 345/204 |
| 2011/0267326 A1 | 11/2011 | Kim et al. |

(Continued)

FOREIGN PATENT DOCUMENTS

| CN | 1784711 A | 6/2006 |
| CN | 1870117 A | 11/2006 |
| CN | 101625838 A | 1/2010 |

(Continued)

OTHER PUBLICATIONS

Office Action dated Jan. 27, 2014 from the Korean Intellectual Property Office in counterpart Korean application No. 10-2012-0043420.

(Continued)

*Primary Examiner* — Latanya Bibbins (74) *Attorney, Agent, or Firm* — Morgan, Lewis & Bockius LLP (57) ABSTRACT

The present invention relates to a liquid crystal display device, and more particularly, to a gate-in-panel (GIP) type dual gate structure liquid crystal display device for minimizing a region occupied by a gate driving unit in the GIP structure liquid crystal display device in which the gate driving unit supplying a gate driving signal is formed on a liquid crystal panel to implement a narrow-bezel, and improving image quality deterioration due to signal delay. According to the present invention, the number of stages may be reduced through the structure of alternately outputting a gate driving voltage other than the structure of simultaneously outputting a gate driving voltage from two gate driving units in a dual GIP type liquid crystal display, thereby minimizing an area occupied by the gate driving unit.

18 Claims, 7 Drawing Sheets

(56) References Cited

U.S. PATENT DOCUMENTS

2012/0013585 A1 1/2012 Jang
2012/0112992 A1 5/2012 Otose et al.

FOREIGN PATENT DOCUMENTS

| CN | 102237062 A | 11/2011 |
| JP | 2009027265 A | 2/2009 |
| KR | 10-2004-0020421 A | 9/2004 |
| KR | 20080063020 A | 7/2008 |
| KR | 10-2011-0120705 A | 4/2011 |

OTHER PUBLICATIONS

Office Action dated Jul. 29, 2014 from the Korean Intellectual Property Office in counterpart Korean application No. 10-2012-0043420.
Notice of Allowance dated Nov. 20, 2014, from the Korean Intellectual Property Office in counterpart Korean application No. 10-2012-0043420.
Office Action dated Jan. 7, 2015 from the State Intellectual Property of China in counterpart Chinese application No. 201210599206.1.

* cited by examiner

LIQUID CRYSTAL DISPLAY DEVICE

CROSS-REFERENCE TO RELATED APPLICATIONS

This application claims the benefit of Korean Patent Application No. 10-2012-0043420, filed on Apr. 25, 2012, which is hereby incorporated by reference for all purposes as if fully set forth herein.

BACKGROUND OF THE INVENTION

1. Field of the Invention

The present invention relates to a liquid crystal display device, and more particularly, to a gate-in-panel (GIP) type dual gate structure liquid crystal display device for minimizing a region occupied by a gate driving unit in the GIP structure liquid crystal display device in which the gate driving unit supplying a gate driving signal is formed on a liquid crystal panel to implement a narrow-bezel, and improving image quality deterioration due to signal delay.

2. Description of the Related Art

In recent years, cathode ray tubes or the like in the related art have been replaced by flat display devices in the electronic information display device field, and such flat display devices may include a liquid crystal display (LCD), a plasma display panel (PDP), a field emission display (FED), an organic light emitting diode (OLED), and the like. Liquid crystal display devices among such flat display devices have been mostly used now due to reasons such as mass production technologies, facilitation of a driving means, implementation of a high-quality screen, and embodiment of a large-sized area screen.

In particular, an active matrix type liquid crystal display device in which a thin-film transistor is used for a switching element is adequate to display dynamic images. A typical liquid crystal display device is provided a gate driving unit for generating and providing scan signals, and also provided with a data driving unit for providing data signals for displaying image gradation.

In particular, an active matrix liquid crystal display device in which a thin-film transistor is used for a switching element is adequate to display dynamic images.

Figure 1:
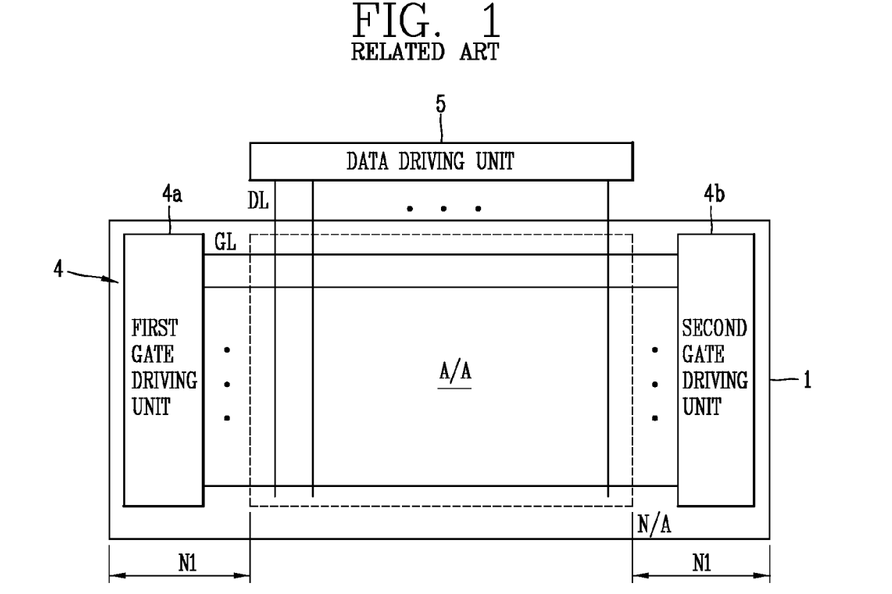
FIG. 1 is a block diagram illustrating a basic configuration of a liquid crystal display device in the related art.

FIG. 1 is a block diagram illustrating a basic configuration of a liquid crystal display device in the related art.

As illustrated in the drawing, a liquid crystal display device in the related art may include a liquid crystal panel 1 for displaying images and driving units 4, 5.

For the liquid crystal panel 1, a plurality of gate lines (GLs) and a plurality of data lines (DLs) are crossed with each other in a matrix form on a substrate using a glass to define a plurality of pixels at the crossed locations and images are displayed based on data signals applied to the pixels. The liquid crystal panel 1 may be divided into a active area (NA) formed with pixels to implement an image, and a non-active area (N/A) surrounding the active area (NA).

The driving units 4, 5 may include a gate driving unit 4 and a data driving unit 5. The gate driving unit 4 controls the turn on/off of switching elements in the pixels arranged on the liquid crystal panel 1 in response to a gate control signal (GCS) supplied from the timing controller (not shown). The gate driving unit 4 outputs a gate driving voltage (VG) to the liquid crystal panel 1 through the gate lines (GLs) to turn on a switching element of the pixel for each line progressively, thereby supplying a data signal supplied from the data driving unit 5 to the pixel for each horizontal period.

The data driving unit 5 modulates digital waveform image data into an analog waveform data signal in response to a data control signal (DCS) supplied from the timing controller. Next, a data signal corresponding to one horizontal period is simultaneously supplied to the liquid crystal panel 1 through all data lines (DLs) for each horizontal period, thereby allowing each pixel to display image gradation.

In such a liquid crystal display device having the foregoing structure, the structure of the gate driving unit 4 is relatively simple compared to that of the data driving unit 5, and a gate-in-panel (GIP) scheme in which the gate driving unit is fabricated on the non-active area (N/A) in the form of a thin-film transistor during the fabrication of a liquid crystal panel substrate, without using a scheme in which the gate driving unit is implemented as a separate integrated circuit (IC) and bonded to the liquid crystal panel has been proposed to reduce the volume, weight and fabrication cost of the liquid crystal display device.

Furthermore, the liquid crystal display device has a motion blur characteristic in which image quality is deteriorated due to the limitation of the liquid crystal response speed. In order to overcome the problem, there has been proposed a scheme in which a driving frequency above 120 Hz other than 60 Hz is applied to the liquid crystal display device. However, when the liquid crystal display device is driven at above 120 Hz, one horizontal period (1H) is reduced to that extent, thereby causing difficulty in securing a time for turning on switching elements for each pixel.

Accordingly, as illustrated in FIG. 1, a structure in which GIP type gate driving units 4 are embedded therein at the left and right sides of the liquid crystal panel 10, and an overlap interval between each front and rear gate driving voltage is provided to turn on the switching element through pre-charging has been applied to a recent liquid crystal display device.

However, as described above, in case of the GIP scheme, the gate driving units 2a, 2b are mounted on the liquid crystal panel 1 through thin-film transistors, and thus the width of the non-active area (N/A) at the left and right sides of the liquid crystal panel is increased. An area (2×N1) occupied by the gate driving units 2a, 2b at both sides of the liquid crystal panel 1 is about 9.5 mm, and most of that area is used based on the size of thin-film transistor.

Figure 2:
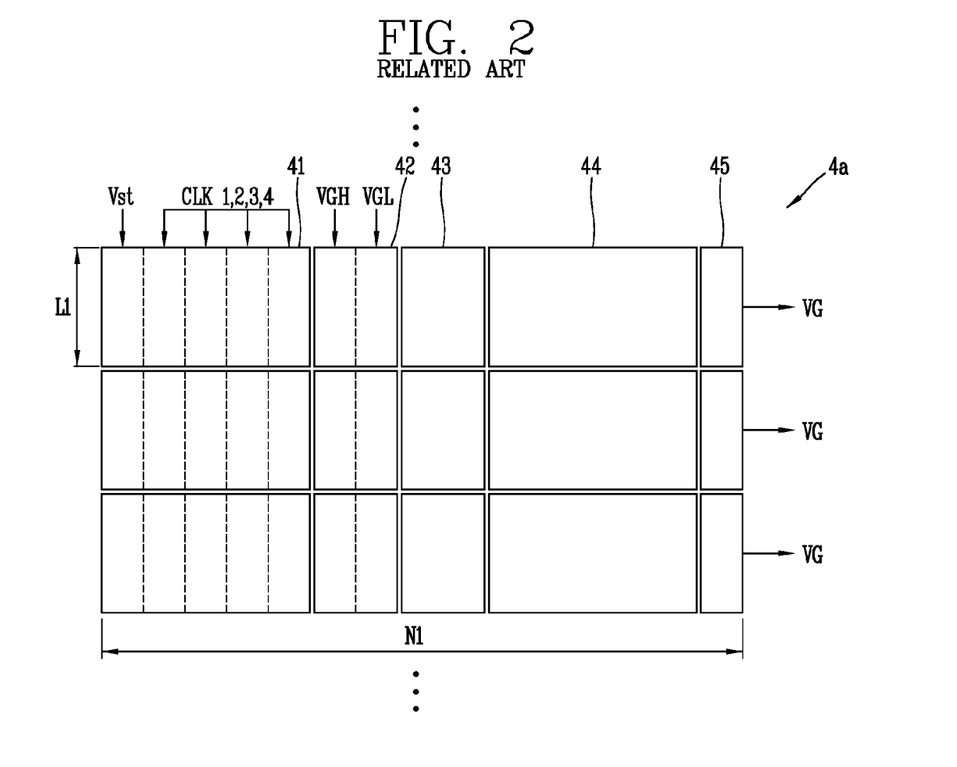
FIG. 2 is a view for explaining an area occupied by one of the GIP type gate driving units on a liquid crystal panel in the related art.

FIG. 2 is a view for explaining an area occupied by one of the GIP type gate driving units on a liquid crystal panel in the related art. As illustrated in the drawing, a first 4-phase GIP gate driving unit 4a may include a clock signal (CLK 1~CLK 4) and start signal (Vst) routing region 21, a gate high voltage (VGH) and gate low voltage (VGL) routing region 22, a shift register region 23, a level shift region 24, and an output routing region 25.

According to the foregoing structure, one stage outputting a gate driving voltage (VG) in the first gate driving unit 2a has a width L1 in the vertical (a short side of the liquid crystal panel) direction and a width N1 in the horizontal (a long side of the liquid crystal panel) direction. Accordingly, in case of a dual gate structure, it occupies a region having a width 2×N1 in the horizontal direction.

In recent years, a narrow bezel structure for minimizing the width of non-active area (N/A) of the liquid crystal display device has been preferentially used, thereby causing a problem that the foregoing dual GIP scheme is not applicable to a narrow bezel type liquid crystal display device with less than 5.5 mm.

SUMMARY OF THE INVENTION

The present invention has been contrived to solve the foregoing problem, an object of the present invention is to minimize an area occupied by a gate driving unit on the liquid crystal panel in a GIP type dual gate structure liquid crystal display device, thereby implementing a narrow bezel liquid type crystal display device.

Furthermore, another object of the present invention is to solve image quality deterioration due to a discharge period delay caused by the signal delay of the gate line in a 120 Hz liquid crystal display device.

In order to accomplish the foregoing objects, a liquid crystal display device according to a first embodiment of the present invention may include a liquid crystal panel formed with n gate lines (n is a natural number); a timing controller configured to receive a timing signal from an external system and generate a first through a fourth clock signal; a first gate driving unit configured to apply a gate high voltage to one side of the (2n−1)th gate line in correspondence to the first and the third clock signal; a second gate driving unit configured to apply the gate high voltage to one side of the (2n)th gate line in correspondence to the second and the fourth clock signal; an L-discharge circuit configured to apply a gate low voltage to the other side of the (2n−1)th gate line in correspondence to a voltage level of the (2n+1)th gate line; and a R-discharge circuit configured to apply the gate low voltage to the other side of the (2n)th gate line in correspondence to a voltage level of the (2n+2)th gate line.

The first through the fourth clock signal may have a high interval of two horizontal periods (2H), respectively, and one horizontal period (1H) may be overlapped between front and rear signals.

The first gate driving unit may include a plurality of L-stages connected to one another, and operated by receiving any one of the first and third clock signals, and the L-discharge circuit may be formed between the plurality of L-stages.

The first gate driving unit may further include at least one dummy L-stage connected to the R-discharge circuit.

The L-discharge circuit may be a plurality of transistors including a first electrode connected to the (2n)th gate line; a second electrode to which the gate low voltage is applied; and a gate electrode connected to the (2n+2)th gate line or dummy line.

The second gate driving unit may include a plurality of R-stages connected to one another, and operated by receiving any one of the second and fourth clock signals, and the R-discharge circuit may be formed between the plurality of R-stages.

The second gate driving unit may further include at least one dummy R-stage connected to the L-discharge circuit.

The R-discharge circuit may be a plurality of transistors including a first electrode connected to the (2n−1)th gate line; a second electrode to which the gate low voltage is applied; and a gate electrode connected to the (2n+1)th gate line or dummy line.

The first and the second gate driving unit may be embedded in the non-active area of the liquid crystal panel.

Furthermore, in order to accomplish the foregoing objects, a liquid crystal display device according to a second embodiment of the present invention may include a liquid crystal panel formed with n gate lines (n is a natural number); a timing controller configured to receive a timing signal from an external system and generate a first through a sixth clock signal; a first gate driving unit configured to apply a gate high voltage to one side of the (2n−1)th gate line in correspondence to the first, the third, and the fifth clock signal; a second gate driving unit configured to apply the gate high voltage to one side of the (2n)th gate line in correspondence to the second, the fourth, and the sixth clock signal; a R-discharge circuit configured to apply a gate low voltage to the other side of the (2n−1)th gate line in correspondence to a voltage level of the (2n+2)th gate line; and a L-discharge circuit configured to apply the gate low voltage to the other side of the (2n)th gate line in correspondence to a voltage level of the (2n+3)th gate line.

The first through the sixth clock signal may have a high interval of three horizontal periods (3H), respectively, and two horizontal periods (2H) may be overlapped between front and rear signals.

The first gate driving unit may include a plurality of L-stages connected to one another, and operated by receiving any one of the first, third and fifth clock signals, and the L-discharge circuit may be formed between the plurality of L-stages.

The first gate driving unit may further include at least one dummy L-stage connected to the R-discharge circuit.

The L-discharge circuit may be a plurality of transistors including a first electrode connected to the (2n)th gate line; a second electrode to which the gate low voltage is applied; and a gate electrode connected to the (2n+3)th gate line or dummy line.

The second gate driving unit may include a plurality of R-stages connected to one another, and operated by receiving any one of the second, fourth and sixth clock signals, and the R-discharge circuit may be formed between the plurality of R-stages.

The second gate driving unit may further include at least one dummy R-stage connected to the L-discharge circuit.

The R-discharge circuit may be a plurality of transistors including a first electrode connected to the (2n−1)th gate line; a second electrode to which the gate low voltage is applied; and a gate electrode connected to the (2n+2)th gate line or dummy line.

The first and the second gate driving unit may be embedded in the non-active area of the liquid crystal panel.

According to a preferred embodiment of the present invention, the number of stages may be reduced through the structure of alternately outputting a gate driving voltage other than the structure of simultaneously outputting a gate driving voltage from two gate driving units in a dual GIP type liquid crystal display, thereby having an effect capable of minimizing an area occupied by the gate driving unit.

Furthermore, according to the present invention, a separate discharge means may be provided for each stage of the gate driving unit to discharge a gate line in synchronization with the output of a subsequent stage for each one horizontal period (1H), thereby having another effect capable of solving the image deterioration of the liquid crystal display device due to a discharge period delay.

BRIEF DESCRIPTION OF THE DRAWINGS

The accompanying drawings, which are included to provide a further understanding of the invention and incorporated in and constitute a part of this specification, illustrate embodiments of the invention and together with the description serve to explain the principles of the invention.

In the drawings.

DETAILED DESCRIPTION OF THE INVENTION

Hereinafter, a liquid crystal display device and a driving unit thereof according to a preferred embodiment of the present invention will be described below with reference to the accompanying drawings.

Figure 3:
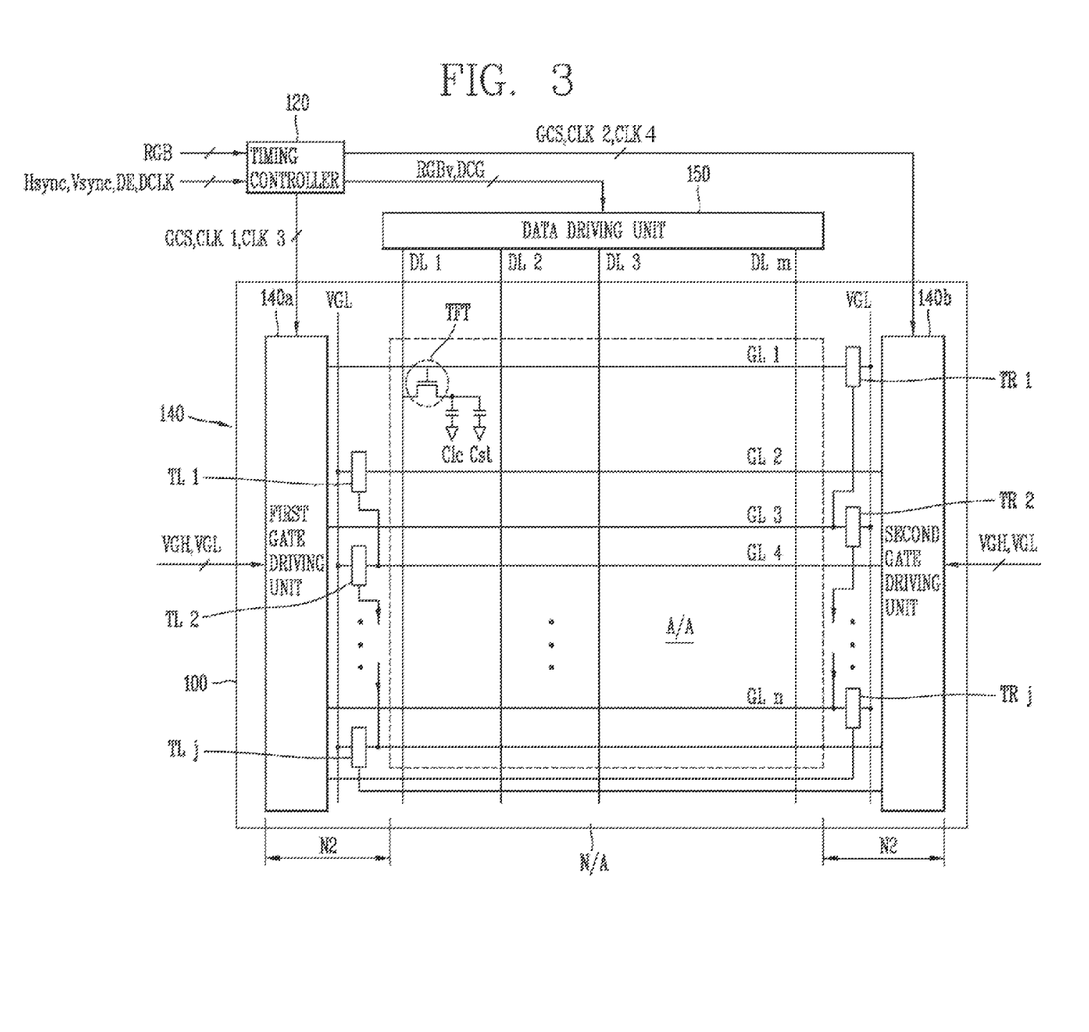
FIG. 3 is a view illustrating a liquid crystal display device and a driving unit thereof according to a first embodiment of the present invention.

FIG. 3 is a view illustrating a liquid crystal display device and a driving unit thereof according to a first embodiment of the present invention.

As illustrated in the drawing, a liquid crystal display according to the present invention may include a liquid crystal panel 100 configured to display an image, a timing controller 120 configured to receive a timing signal from an external system and generate various control signals, and gate and data driving units 140, 150 configured to control the liquid crystal panel 100 in correspondence to the control signals.

For the liquid crystal panel 100, a plurality of gate lines (GLs) and a plurality of data lines (DLs) are crossed with each other in a matrix form on a substrate using a glass to define a plurality of pixels at the crossed locations. Each pixel is provided with a thin-film transistor, a liquid crystal capacitor (Clc), and a storage capacitor (Cst), and all the pixels constitute one active area (A/A). An area in which pixels are not defined is classified into a non-active area (N/A).

The timing controller 120 receives timing signals such as an image signal (RGB), a clock signal (DCLK), a horizontal synchronization signal (Hsync), a vertical synchronization signal (Vsync), a data enable signal (DE), and the like from an external system to generate control signals for the gate driving unit 140 and data driving unit 150.

Here, the horizontal synchronization signal (Hsync) is a signal indicating a time required to display one horizontal line on the screen, and the vertical synchronization signal (Vsync) is a signal indicating a time required to display one frame on the screen. Furthermore, the data enable signal (DE) is a signal indicating a period for supplying a data voltage to a defined pixel of the liquid crystal panel 100.

Furthermore, the timing controller 120 generates a control signal (GCS) of the gate driving unit 140 and a control signal (DCS) of the data driving unit 150 in synchronization with the received timing signal.

In addition, the timing controller 120 generates a plurality of clock signals (CLK 1~CLK 4) for determining a drive time of each stage in the gate driving unit 140 to provide them to the gate driving unit 140. Here, the first through fourth clock signals (CLK 1~CLK 4) are signals for maintaining a high interval of two horizontal periods (2H), and overlapped with each other for one horizontal period (1H).

Furthermore, the timing controller 120 may output the received image data (RGB DATA) by aligning and modulating them in a form that can be processed by the data driving unit 150. Here, the aligned image data (RGBv) may be a form to which a color coordinate calibration algorithm for image quality enhancement is applied.

Two gate driving units 140 are provided in the non-active area (N/A) at both ends of the liquid crystal panel 100. Each gate driving unit 140a, 140b is comprised of a plurality of stages containing shift registers. During the fabricating a substrate of the liquid crystal panel 100, the gate driving unit 140 is embedded therein in a thin-film pattern form on the non-active area (N/A) in a gate-in-panel (GIP) scheme.

The first and the second gate driving units 140a, 140b alternately outputs a gate high voltage (VGH) for each two horizontal periods (2H) through a plurality of gate lines (GL 1~GL n) formed in the liquid crystal panel 100 in response to a gate control signal (GCS) received from the timing controller 120. Here, the output gate high voltage (VGH) maintains for two horizontal periods (2H) and the front and rear gate high voltages (VGH) are overlapped with each other for one horizontal period (1H). It is provided to pre-charge the gate lines (GL 1~GL n), thereby performing a stable pixel charging operation compared to when applying a data voltage.

To this end, a first and a third clock signal (CLK 1, CLK 3) having two horizontal periods (2H), respectively, are applied to the first gate driving unit 140a, and a second and a fourth clock signal (CLK 2, CLK 4) overlapped with the first and the third clock signal (CLK 1, CLK 3) for one horizontal period (1H) and having two horizontal periods (2H) are applied to the second gate driving unit 140b.

For an example, if the first gate driving unit 140a outputs a gate high voltage (VGH) to the n-th gate line (GL n), then the second gate driving unit 140b outputs a gate high voltage (VGH) to the (n+1)th gate line (GL n+1) after one horizontal period (1H).

Next, if the first gate driving unit 140a outputs a gate high voltage (VGH) to the (n+2)th gate line (GL n+2) again after one horizontal period (1H), then the first gate driving unit 140a outputs a gate low voltage (VGL) to the n-th gate line (GL n) at the same time to turn off the thin-film transistor (TFT), thereby maintaining a data voltage charged in the liquid crystal capacitor (CIO for one frame.

In particular, the present invention may further include a discharge circuit (TL 1~TL j, TR 1~TR j) at a time point when a voltage of the gate line (GL n) is switched from a gate high voltage (VGH) to a gate low voltage (VGL) to minimize a discharge delay of the gate line (GL 1~GL n).

The foregoing discharge circuit is connected to an end of each gate line (GL 1~GL n) to correspond to the each gate line (GL 1~GL n), and a R-discharge circuit (TR 1~TR j, j is a natural number) connected to the odd numbered gate line (GL 2n−1) is provided adjacent to the second gate driving unit 140b, and a L-discharge circuit (TL 1~TL j) connected to the even numbered gate line (GL 2n) is provided adjacent to the first gate driving unit 140a.

Here, each discharge circuit (TL 1~TL j, TR 1~TR j) is connected to a gate line (GL n+2) subsequent to the second one on the basis of one gate line (GL n) to apply a gate low voltage (VGL) to the relevant gate line (GL n).

The discharge circuit (TL 1~TL j, TR 1~TR j) is formed with a thin-film transistor between each stage constituting the gate driving unit 140. Accordingly, an area (2×N2) occupied by each gate driving unit 140a, 140b in the non-active area (N/A) of the liquid crystal panel 100 may be reduced, thereby implementing a narrow bezel.

The structure of a stage and a discharge circuit of the gate driving unit 140 will be described below in more detail.

The data driving unit 150 selectively converts modulation image data (RGBv) in a digital form received in correspondence to the data control signal (DCS) received from the timing controller 120 into data voltage (VDATA) in an analog form based on a reference voltage (Vref). The data voltage (VDATA) is latched for each horizontal line, and entered to the liquid crystal panel 100 at the same time through all the data lines (DL 1~DL m) for one horizontal period (1H).

According to the foregoing structure, in a liquid crystal display device including an integrated driving circuit according to an embodiment of the present invention, the number of stages may be reduced through the structure of alternately outputting a gate driving voltage other than the structure of simultaneously outputting a gate driving voltage from both gate driving units, and a separate discharge means may be provided between each stage to assist the discharge of the gate line, thereby minimizing a discharge period delay.

Hereinafter, the structure of a gate driving unit and a discharge circuit according to a first embodiment of the present invention will be described in more detail with reference to the drawing.

Figure 4:
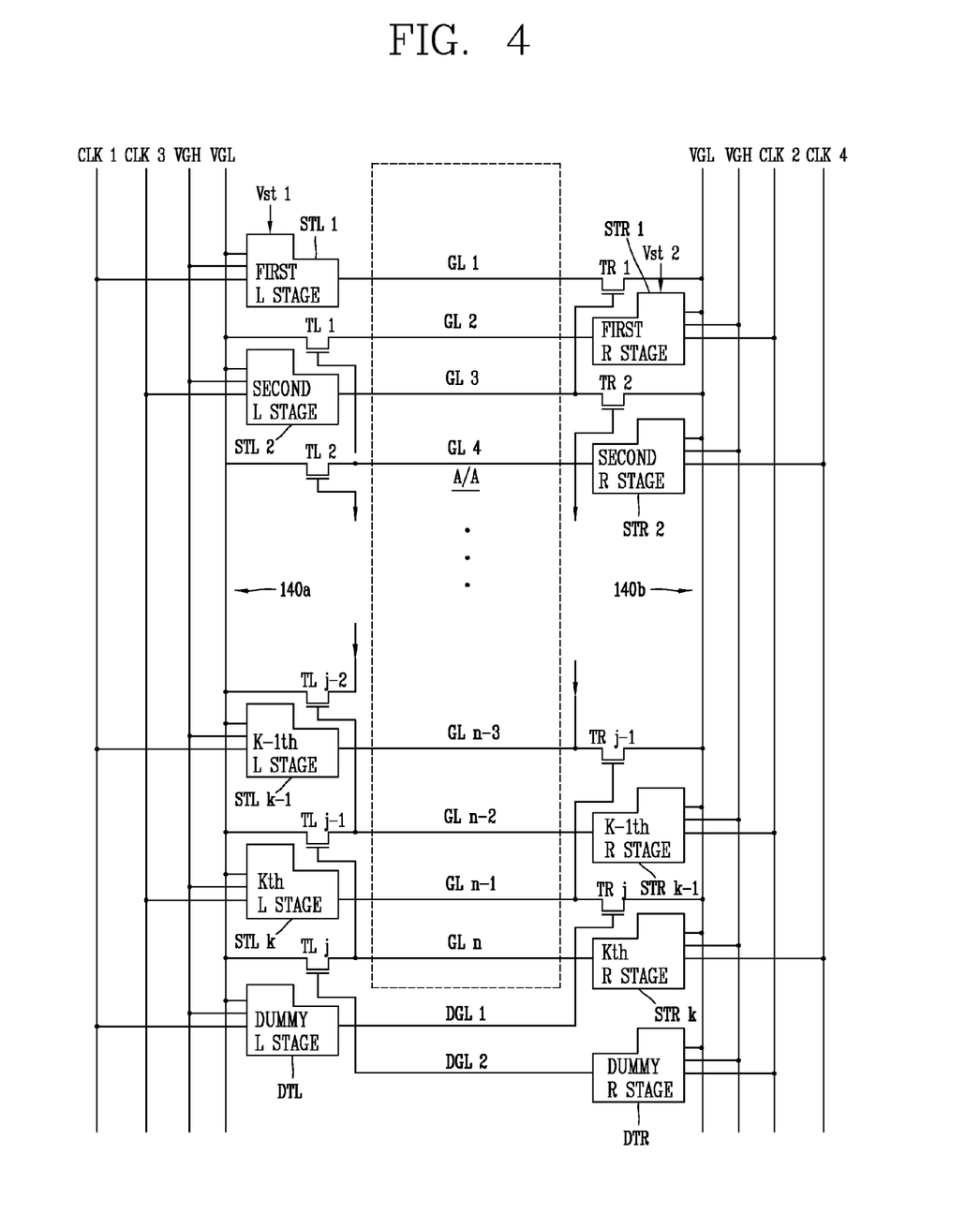
FIG. 4 is a view illustrating the structure of a gate driving unit and a discharge circuit formed on a liquid crystal panel according to a first embodiment of the present invention.

FIG. 4 is a view illustrating the structure of a gate driving unit and a discharge circuit formed on a liquid crystal panel according to a first embodiment of the present invention.

As illustrated in the drawing, a gate driving unit according to the present invention may include a first gate driving unit 140a formed at an end of the liquid crystal panel and a second gate driving unit 140b formed at the other end thereof. Furthermore, the discharge circuit may include a plurality of L-discharge transistors (TL 1~TL j) formed between each stage of the first gate driving unit 140a and a plurality of R-discharge transistors (TR 1~TR j) formed between each stage of the second gate driving unit 140b.

A first through a fourth clock signal (CLK 1~CLK 4) in a four-phase scheme and a gate high voltage (VGH) and a gate low voltage (VGL) are applied to each stage, and though not shown in the drawing, the power voltage (VDD) and ground voltage (GND) may be also applied thereto. In particular, a high interval of the first through the fourth clock signal (CLK 1~CLK 4) maintains for two horizontal periods (2H), and the first through the fourth clock signal (CLK 1~CLK 4) are overlapped with one another for one horizontal period (1H). Furthermore, the gate high voltage (VGH) is a voltage for turning on a thin-film transistor in the active area (NA), and the gate low voltage (VGL) is a voltage for turning off the thin-film transistor.

The first gate driving unit 140a receives the first and the third clock signal (CLK 1, CLK 3), and the gate high voltage (VGH) and gate low voltage (VGL), and outputs a gate driving voltage to a plurality of odd numbered gate lines (GL 2n−1) based on a first start voltage (Vst 1) corresponding to the gate start pulse (GSP). The gate high voltage (VGH) for turning on a thin-film transistor among gate driving voltages is output for each two horizontal periods (2H). Furthermore, front and rear gate high voltages (VGH) are overlapped with each other for each one horizontal period (1H).

The first gate driving unit 140a may include a plurality of a first through a k-th (k is a natural number) L-stages (STL 1~STL k) an output end of which is connected to an end of the first start voltage (Vst 1), and a dummy L-stage (DTL).

The second gate driving unit 140b receives the second and the fourth clock signal (CLK 2, CLK 4), and the gate high voltage (VGH) and gate low voltage (VGL), and outputs a gate driving voltage to a plurality of even numbered gate lines (GL 2n) based on a second start voltage (Vst 2) corresponding to the gate start pulse (GSP).

The second gate driving unit 140b may include a plurality of a first through a k-th (k is a natural number) R-stages (STR 1~STR k) an output end of which is connected to an end of the second start voltage (Vst 2), and a dummy R-stage (DTR).

Furthermore, an L-discharge transistor (TL 1~TL j) are provided between each L-stage (STL 1~STL k) and the dummy L-stage (DTL).

A first electrode of the L-discharge transistor (TL 1~TL j) is connected to an even numbered gate line (GL 2n) connected to an output end of the R-stage (STR 1~STR k). A second electrode thereof is connected to a gate low voltage (VGL) supply line. Furthermore, a gate electrode thereof is connected to an even numbered gate line connected to an output end of the R-stage (STR 1~STR k) or dummy R-stage (DTR), but connected to an even numbered gate line (GL 2n+2) subsequent to the line connected to the first electrode or a dummy gate line (DGL 1).

In other words, the first electrode of the first L-discharge transistor (TL 1) is connected to the second gate line (GL 2), and the gate electrode is connected to the fourth gate line (GL 4), and a gate low voltage (VGL) is applied to the second electrode.

A first electrode of the R-discharge transistor (TR 1~TR j) is connected to an odd numbered gate line (GL 2n−1) connected to an output end of the L-stage (STL 1~STL k). A second electrode thereof is connected to a gate low voltage (VGL) supply line. Furthermore, a gate electrode thereof is connected to an odd numbered gate line connected to an output end of the L-stage (STL 1~STL k) or dummy L-stage (DTL), but connected to an odd numbered gate line (GL 2n+1) subsequent to the line connected to the first electrode or a dummy gate line (DGL 2).

Here, the foregoing L, R-stage (DTL, DTR) is provided to drive the last discharge transistor since there exist no subsequent L, R-stage (STL k, STR k).

In other words, the first electrode of the first R-discharge transistor (TR 1) is connected to the first gate line (GL 1), and the gate electrode is connected to the third gate line (GL 3), and a gate low voltage (VGL) is applied to the second electrode.

Hereinafter, a method of driving the gate driving unit and discharge circuit having the foregoing structure in a four-phase scheme will be described as follows.

When the first and the second start voltage (Vst 1, Vst 2) are applied to the first and the second gate driving unit 140a, 140b, respectively, the first L-stage (STL 1) of the first gate driving unit 140a first outputs a gate high voltage (VGH) to the first gate line (GL 1) in correspondence to the first clock signal (CLK 1) for two horizontal periods (2H).

Next, the first R-stage (STR 1) of the second gate driving unit 140b outputs a gate high voltage (VGH) to the second gate line (GL 2) in correspondence to the second clock signal (CLK 2) for two horizontal periods (2H).

Here, the first clock signal (CLK 1) and second clock signal (CLK 2) are overlapped with each other for one horizontal period (1H), and thus a rear portion of the gate high voltage (VGH) applied to the first gate line and a front portion of the gate high voltage (VGH) applied to the second gate line are overlapped with each other for one horizontal period (1H). During the overlapped period, the data driving unit applies a data voltage to each pixel through the data line.

Next, the second L-stage (STL 2) outputs a gate high voltage (VGH) to the third gate line (GL 3) for two horizontal periods (2H) in correspondence to the third clock signal (CLK 3).

Furthermore, the third clock signal (CLK 3) and second clock signal (CLK 2) are overlapped with each other for one horizontal period (1H), and thus a front portion of the gate high voltage (VGH) applied to the third gate line (GL 3) and a rear portion of the gate high voltage (VGH) applied to the second gate line (GL 2) are overlapped with each other for one horizontal period (1H).

At this time, the first L-stage (STL 1) outputs a gate low voltage (VGL) to the first gate line (GL 1) in correspondence to the first clock signal (CLK 1), and at the same time, a gate high voltage (VGH) is applied to a gate end of the first R-discharge transistor (TR 1) connected to an end of the third gate line (GL 3). Accordingly, the first R-discharge transistor (TR 1) is turned on. The second electrode of the first R-discharge transistor (TR 1) is connected to a gate low voltage (VGL) line, and the gate high voltage (VGH) charged in the first gate line (GL 1) is transitioned to a gate low voltage (VGL).

In other words, a gate low voltage (VGL) is applied at both side ends of the first gate line (GL 1) to minimize a signal delay due to its line resistance, and thus the first gate line (GL 1) is rapidly discharged. The subsequent charging and discharging operation of the gate line is carried out in the same form.

Figure 5A:
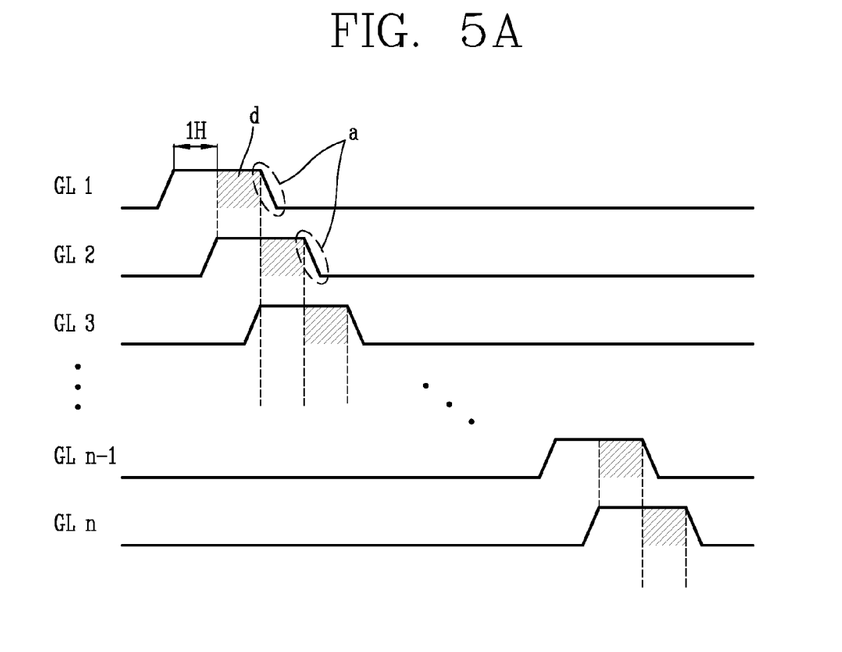
FIG. 5A is a view illustrating a voltage change for a gate line of a GIP type dual gate structure liquid crystal display device with no discharge circuit.
Figure 5B:
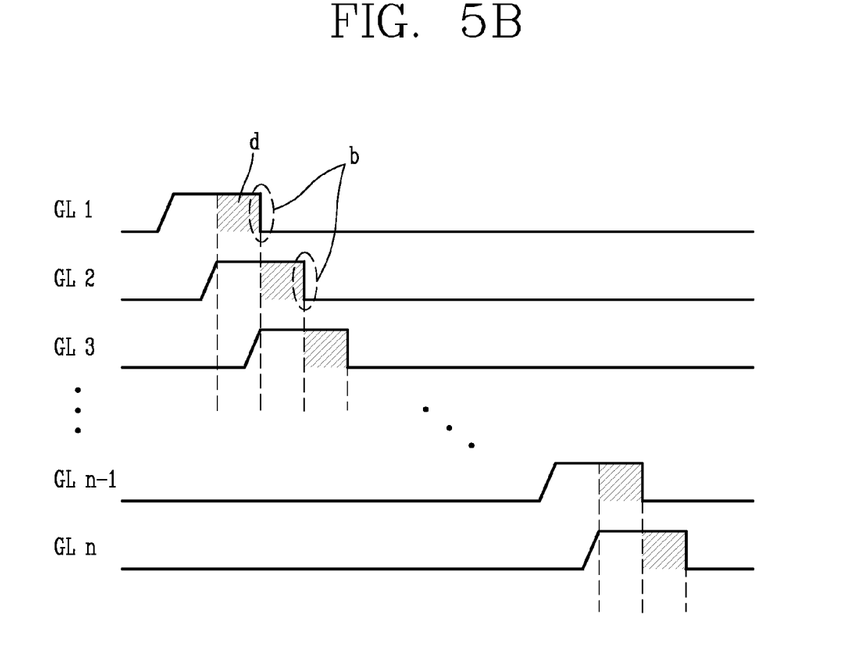
FIG. 5B is a view illustrating a voltage change for a gate line of a liquid crystal display device according to a first embodiment of the present invention.

FIG. 5A is a view illustrating a voltage change for a gate line of a GIP type dual gate structure liquid crystal display device with no discharge circuit, and FIG. 5B is a view illustrating a voltage change for a gate line of a liquid crystal display device according to a first embodiment of the present invention.

As illustrated in FIG. 5A, in case of a dual gate structure GIP type liquid crystal display device with no discharge circuit, each gate line (GL 1~GL n) is charged to a gate high voltage (VGH) level for two horizontal periods (2H), and then discharged to a gate low voltage (VGL) level again, and they are overlapped with each other for one horizontal period (1H). Here, a data voltage is applied to each pixel during an overlapped period (d) of the front and rear gate lines (GL n−1~GL n).

At this time, a signal delay occurs due to a line resistance of the gate line (GL 1~GL n) prior to or subsequent to charging, and as a result, it is seen that the voltage level has a smooth shape (a). In particular, the signal delay during discharge has an effect on a data voltage applied to the pixel, thereby causing image quality deterioration.

However, referring to FIG. 5B, in a liquid crystal display device having a discharge circuit according to a first embodiment of the present invention, a gate low voltage (VGL) is applied at both side ends of gate line by a discharge transistor during the discharge of the gate line (GL 1~GL n), and thus the voltage level is transitioned in an abruptly inclined manner (b).

On the other hand, in addition to the foregoing 4-phase drive scheme, a 6-phase drive scheme in which the clock signal is further divided for its stable operation may be applicable to a liquid crystal display device operated at a frequency above 120 Hz.

Hereinafter, a 6-phase drive dual GIP type liquid crystal display device and a driving unit thereof according to a second embodiment of the present invention will be described with reference to the drawing.

Figure 6:
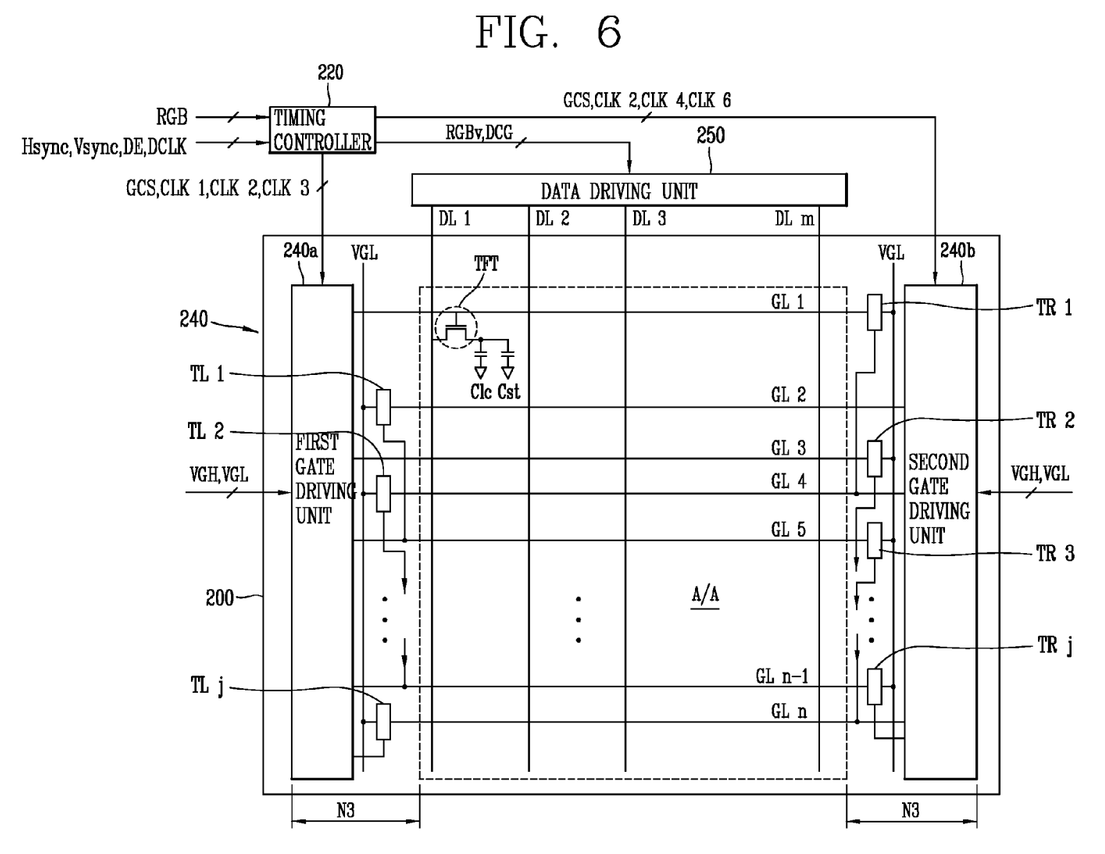
FIG. 6 is a view illustrating the structure of a gate driving unit and a discharge circuit formed on a liquid crystal panel according to a second embodiment of the present invention.

FIG. 6 is a view illustrating the structure of a gate driving unit and a discharge circuit formed on a liquid crystal panel according to a second embodiment of the present invention.

As illustrated in the drawing, a second embodiment of the present invention may use 6-phase clock signals (CLK 1~CLK 6) for more stable operation during the operation at 120 Hz, contrary to the foregoing first embodiment.

A liquid crystal display device according to a second embodiment of the present invention may include a liquid crystal panel 200 configured to display an image, a timing controller 220 configured to receive a timing signal from an external system and generate various control signals, and gate and data driving units 240, 250 configured to control the liquid crystal panel 200 in correspondence to the control signals.

In particular, the timing controller 220 generates a control signal (GCS) of the gate driving unit 240 and a control signal (DCS) of the data driving unit 250 in synchronization with the received timing signal. Furthermore, the timing controller 220 generates a plurality of clock signals (CLK 1~CLK 6) for determining a drive time of each stage in the gate driving unit 240. Here, the first through sixth clock signals (CLK 1~CLK 6) are signals for maintaining a high interval of three horizontal periods (3H), and overlapped with each other for two horizontal periods (2H). The first, third and fifth clock signals (CLK 1, CLK 3, CLK 5) are provided to the first gate driving unit 240a, and the second, fourth an sixth clock signals (CLK 2, CLK 4, CLK 6) are provided to the second gate driving unit 240b.

Furthermore, the timing controller 220 may output the received image data (RGB DATA) by aligning and modulating them in a form that can be processed by the data driving unit 250.

Two gate driving units 240 are provided in the non-active area (N/A) at both ends of the liquid crystal panel 200. Each gate driving unit 240a, 240b is comprised of a plurality of stages containing shift registers. During the fabrication of a substrate of the liquid crystal panel 200, the gate driving unit 240 is embedded therein in a thin-film pattern form on the non-active area in a gate-in-panel (GIP) scheme.

The first and the second gate driving units 240a, 240b alternately outputs a gate high voltage (VGH) for each three horizontal periods (3H) through a plurality of gate lines (GL 1~GL n) formed in the liquid crystal panel 200 in response to a gate control signal (GCS) received from the timing controller 220. Here, the output gate high voltage (VGH) maintains for three horizontal periods (3H) and the front and rear gate high voltages (VGH) are overlapped with each other for two horizontal period (2H). It is provided to pre-charge the gate lines (GL 1~GL n), thereby performing a stable pixel charging operation compared to when applying a data voltage.

To this end, a first, a third and a fifth clock signal (CLK 1, CLK 3, CLK 5) having three horizontal periods (3H), respectively, are applied to the first gate driving unit 240a, and a second, a fourth and a sixth clock signal (CLK 2, CLK 4, CLK 6) overlapped with the first, the third and the fifth clock signal (CLK 1, CLK 3, CLK 5) for two horizontal periods (2H) and having three horizontal periods (3H) are applied to the second gate driving unit 240b.

For an example, if the first gate driving unit 240a outputs a gate high voltage (VGH) to the n-th gate line (GL n), then the second gate driving unit 240b outputs a gate high voltage (VGH) to the (n+1)th gate line (GL n+1) after one horizontal period (1H), and the first gate driving unit 240a outputs a gate high voltage (VGH) to the (n+2)th gate line (GL n+2) after one horizontal period (1H).

Next, the second gate driving unit 240b outputs a gate high voltage (VGH) to the (n+3)th gate line (GL n+3) again after one horizontal period (1H), and then the first gate driving unit 240a outputs a gate high voltage (VGH) to the (n+4)th gate line (GL n+4) while at the same time the first gate driving unit 240a output a gate low voltage (VGL) to the n-th gate line (GL n) to turn off the thin-film transistor (TFT), thereby maintaining a data voltage charged in the liquid crystal capacitor (Clc) for one frame.

Accordingly, a discharge circuit (TL 1~TL j, TR 1~TR j) for applying a gate low voltage (VGL) is activated at a time point when a voltage of the gate line (GL n) is switched from a gate high voltage (VGH) to a gate low voltage (VGL) to discharge the gate line (GL n), thereby minimizing the discharge delay.

The foregoing discharge circuit is connected to an end of each gate line (GL 1~GL n) to correspond to the each gate line (GL 1~GL n), and a R-discharge circuit (TR 1~TR j, j is a natural number) connected to the odd numbered gate line (GL 2n-1) is provided adjacent to the second gate driving unit 240b, and a L-discharge circuit (TL 1~TL j) connected to the even numbered gate line (GL 2n) is provided adjacent to the first gate driving unit 240a.

Here, each discharge circuit (TL 1~TL j, TR 1~TR j) is connected to a gate line (GL n+3) provided subsequent to the third one on the basis of one gate line (GL n) to apply a gate low voltage (VGL) to the relevant gate line (GL n).

The discharge circuit (TL 1~TL j, TR 1~TR j) is formed with a thin-film transistor between each stage constituting the gate driving unit 240. Accordingly, an area (2×N3) occupied by each gate driving unit 240a, 240b in the non-active area (N/A) of the liquid crystal panel 200 may be reduced.

The structure of a stage and a discharge circuit of the gate driving unit 240 will be described below in more detail.

The data driving unit 250 selectively converts modulation image data (RGBv) in a digital form received in correspondence to the data control signal (DCS) received from the timing controller 220 into data voltage (VDATA) in an analog form based on a reference voltage (Vref). The data voltage (VDATA) is latched for each horizontal line, and entered to the liquid crystal panel 100 at the same time through all the data lines (DL 1~DL m) for one horizontal period (1H).

According to the foregoing structure, in a liquid crystal display device including an integrated driving circuit according to an embodiment of the present invention, the number of stages may be reduced through the structure of alternately outputting a gate driving voltage other than the structure of simultaneously outputting a gate driving voltage from both gate driving units, and a separate discharge means may be provided between each stage to assist the discharge of the gate line, thereby minimizing a discharge period delay.

Hereinafter, the structure of a gate driving unit and a discharge circuit according to a second embodiment of the present invention will be described in more detail with reference to the drawing.

Figure 7:
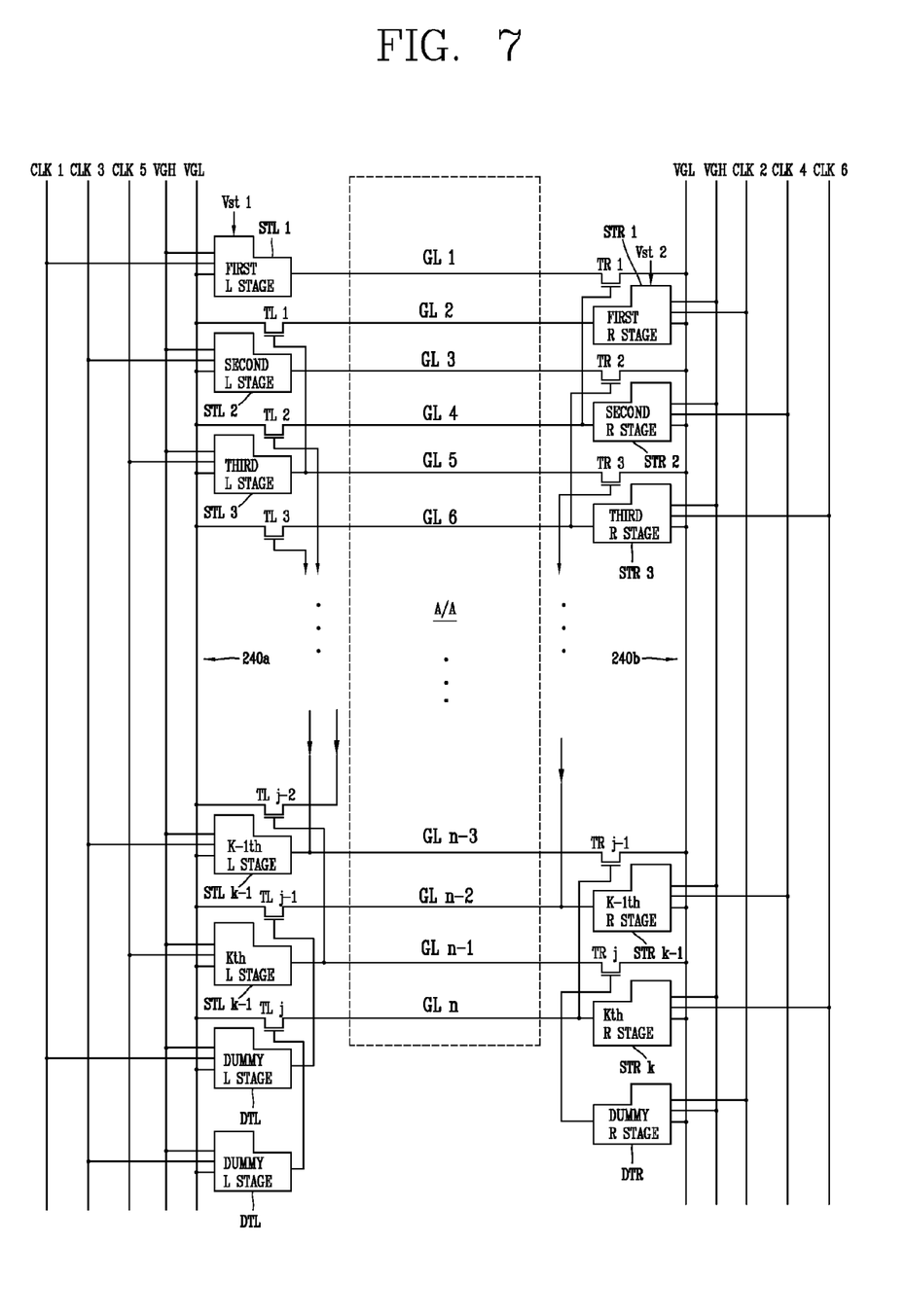
FIG. 7 is a view illustrating the structure of a gate driving unit and a discharge circuit formed on a liquid crystal panel according to a second embodiment of the present invention.

FIG. 7 is a view illustrating the structure of a gate driving unit and a discharge circuit formed on a liquid crystal panel according to a second embodiment of the present invention.

A gate driving unit may include a first gate driving unit 240a formed at an end of the liquid crystal panel and a second gate driving unit 240b formed at the other end thereof. Furthermore, the discharge circuit may include a plurality of L-discharge transistors (TL 1~TL j) formed between each stage of the first gate driving unit 240a and a plurality of R-discharge transistors (TR 1~TR j) formed between each stage of the second gate driving unit 240b.

A first through a sixth clock signal (CLK 1~CLK 6) in a six-phase scheme and a gate high voltage (VGH) and a gate low voltage (VGL) are applied to each stage, and though not shown in the drawing, the power voltage (VDD) and ground voltage (GND) may be also applied thereto. In particular, a high interval of the first through the sixth clock signal (CLK 1~CLK 6) maintains for three horizontal periods (3H), and the first through the sixth clock signal (CLK 1~CLK 6) are overlapped with one another for two horizontal periods (2H). Furthermore, the gate high voltage (VGH) is a voltage for turning on a thin-film transistor in the active area (A/A), and the gate low voltage (VGL) is a voltage for turning off the thin-film transistor.

The first gate driving unit 240a receives the first, the third and the fifth clock signal (CLK 1, CLK 3, CLK 5), and the gate high voltage (VGH) and gate low voltage (VGL), and outputs a gate driving voltage to a plurality of odd numbered gate lines (GL 2n-1) based on a first start voltage (Vst 1) corresponding to the gate start pulse (GSP). The gate high voltage (VGH) for turning on a thin-film transistor among gate driving voltages is output for each three horizontal periods (3H). Furthermore, front and rear gate high voltages (VGH) are overlapped with each other for each two horizontal periods (2H).

The first gate driving unit 240a may include a plurality of a first through a k-th (k is a natural number) L-stages (STL 1~STL k) an output end of which is connected to an end of the first start voltage (Vst 1), and two dummy L-stages (DTLs).

The second gate driving unit 240b receives the second, the fourth and the sixth clock signal (CLK 2, CLK 4, CLK 6), and the gate high voltage (VGH) and gate low voltage (VGL), and outputs a gate driving voltage to a plurality of even numbered gate lines (GL 2n) based on a second start voltage (Vst 2) corresponding to the gate start pulse (GSP).

The second gate driving unit 240b may include a plurality of a first through a k-th (k is a natural number) R-stages (STR 1~STR k) an output end of which is connected to an end of the second start voltage (Vst 2), and two dummy R-stages (DTRs).

Furthermore, an L-discharge transistor (TL 1~TL j) is provided between each L-stage (STL 1~STL k) and the dummy L-stage (DTL).

Here, the foregoing dummy L, R-stage (DTL, DTR) is provided to drive the last discharge transistor since there exists no subsequent L, R-stage (STL k, STR k).

A first electrode of the L-discharge transistor (TL 1~TL j) is connected to an even numbered gate line (GL 2n) connected to an output end of the R-stage (STR 1~STR k) and dummy R-stage (DTR). A gate electrode thereof is connected to a gate line subsequent to the first electrode. Furthermore, a second electrode of the L-discharge transistor (TL 1~TL j) is connected to a gate low voltage (VGL) supply line.

In other words, the first electrode of the first L-discharge transistor (TL 1) is connected to the second gate line (GL 2), and the gate electrode is connected to the fourth gate line (GL 4), and a gate low voltage (VGL) is applied to the second electrode.

Furthermore, a R-discharge transistor (TR 1~TR j) is provided between each R-stage (STR 1~STR k) and the dummy R-stage (DTR).

A first electrode of the R-discharge transistor (TR 1~TR j) is connected to an even numbered gate line (GL 2n) connected to an output end of the L-stage (STL 1~STL k).

A gate electrode thereof is connected to a gate line subsequent to the first electrode. Furthermore, a second electrode of the L-discharge transistor (TL 1 TL j) is connected to a gate low voltage (VGL) supply line.

In other words, the first electrode of the first R-discharge transistor (TR 1) is connected to the first gate line (GL 1), and the gate electrode is connected to the third gate line (GL 3), and a gate low voltage (VGL) is applied to the second electrode.

Hereinafter, a method of driving the gate driving unit and discharge circuit having the foregoing structure in a six-phase scheme will be described as follows.

When the first and the second start voltage (Vst 1, Vst 2) are applied to the first and the second gate driving unit 240a, 240b, respectively, the first L-stage (STL 1) of the first gate driving unit 240a first outputs a gate high voltage (VGH) to the first gate line (GL 1) in correspondence to the first clock signal (CLK 1) for two horizontal periods (2H).

Next, the first R-stage (STR 1) of the second gate driving unit 240b outputs a gate high voltage (VGH) to the second gate line (GL 2) in correspondence to the second clock signal (CLK 2) for two horizontal periods (2H).

Here, the first clock signal (CLK 1) and second clock signal (CLK 2) are overlapped with each other for two horizontal periods (2H), and thus a rear portion of the gate high voltage (VGH) applied to the first gate line (GL 1) and a front portion of the gate high voltage (VGH) applied to the second gate line (GL 2) are overlapped with each other for two horizontal periods (2H).

Next, the second L-stage (STL 2) outputs a gate high voltage (VGH) to the third gate line (GL 3) in correspondence to the third clock signal (CLK 3), and then the second R-stage (STR 2) outputs a gate high voltage (VGH) to the fourth gate line (GL 4) for two horizontal periods (2H) in correspondence to the fourth clock signal (CLK 4)

At this time, the first L-stage (STL 1) outputs a gate low voltage (VGL) to the first gate line (GL 1) in correspondence to the first clock signal (CLK 1), and at the same time, a gate high voltage (VGH) is applied to a gate end of the first R-discharge transistor (TR 1) connected to an end of the fourth gate line (GL 4). Accordingly, the first R-discharge transistor (TR 1) is turned on. The second electrode of the first R-discharge transistor (TR 1) is connected to a gate low voltage (VGL) line, and the gate high voltage (VGH) charged in the first gate line (GL 1) is transitioned to a gate low voltage (VGL).

In other words, a gate low voltage (VGL) is applied at both side ends of the first gate line (GL 1) to minimize a signal delay due to its line resistance, and thus the first gate line (GL 1) is rapidly discharged. The subsequent charging and discharging operation of the gate line is carried out in the same form.

Figure 8:
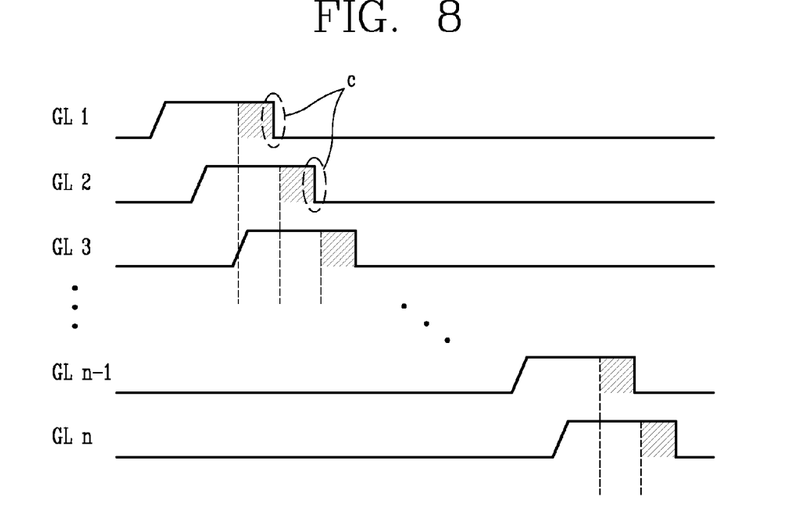
FIG. 8 is a view illustrating a voltage change for a gate line of a liquid crystal display device according to a second embodiment of the present invention.

FIG. 8 is a view illustrating a voltage change for a gate line of a liquid crystal display device according to a second embodiment of the present invention.

As illustrated in FIG. 8, in a liquid crystal display device having a discharge circuit according to a first embodiment of the present invention, each gate line (GL 1~GL n) is charged to a gate high voltage (VGH) level for three horizontal periods (3H), and then discharged to a gate low voltage (VGL) level again. At this time, the adjoining gate lines (GL 1~GL n) are overlapped with one another for two horizontal periods (2H), lines connected to the same gate driving unit are overlapped with one another for one horizontal period (1H). Here, a data voltage (d) is applied to each pixel for one horizontal period (1H) of an overlapped period between the gate lines (GL n–1~GL n).

In particular, as illustrated in the drawing, a gate low voltage (VGL) is applied to both side ends during the discharge of the gate line, and thus the voltage level has an abruptly inclined shape, and is transitioned to a gate low voltage (VGL) level (c).

Accordingly, when compared to a voltage level of the gate line in a dual GIP type liquid crystal display device with no discharge circuit illustrated in the foregoing FIG. 5A, a signal delay occurs due to a line resistance of the gate line (GL 1~GL n) prior to or subsequent to charging in the related art and thus the voltage level has a smooth shape (a), but it is seen that a voltage of the gate line in a liquid crystal display device according to a second embodiment of the present invention is abruptly transitioned during discharge.

Figure 9:
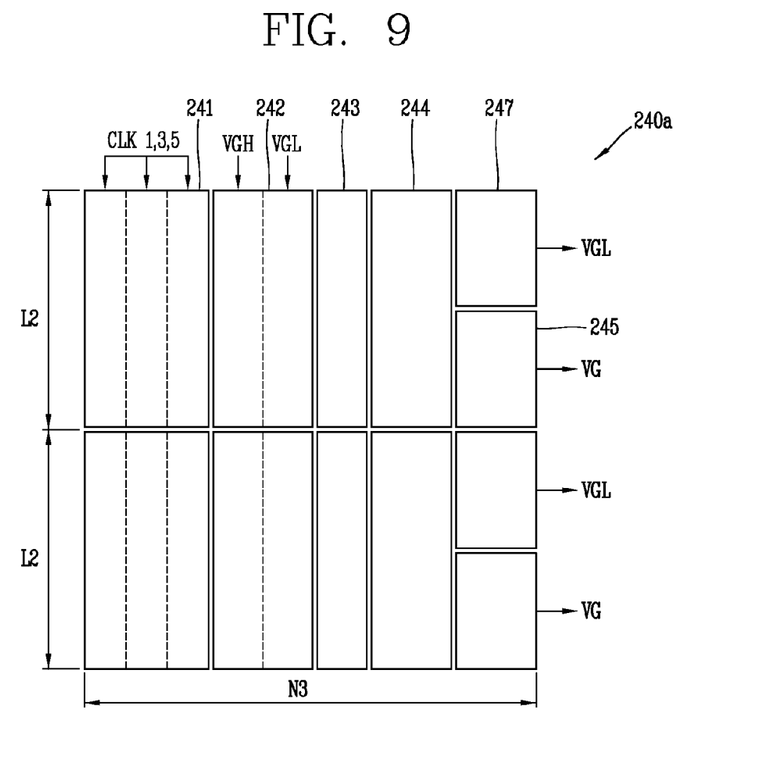
FIG. 9 is a view for explaining an area occupied by one of gate driving units of a liquid crystal display according to a second embodiment of the present invention.

FIG. 9 is a view for explaining an area occupied by one of gate driving units of a liquid crystal display according to a second embodiment of the present invention.

As illustrated in the drawing, a first 6-phase GIP gate driving unit 240a may include a clock signal (CLK 1~CLK 6) and start signal (Vst) routing region 241, a gate high voltage (VGH) and gate low voltage (VGL) routing region 242, a shift register region 243, a level shift region 244, and an output routing region 245.

Furthermore, a discharge circuit region 247 for outputting a gate low voltage (VGL) to the gate line is further formed adjacent to the output routing region 245.

According to the foregoing structure, one stage outputting a gate driving voltage (VG) in the first gate driving unit 240a has a width L2 in the vertical (a short side of the liquid crystal panel) direction and a width N3 in the horizontal (a long side of the liquid crystal panel) direction. Accordingly, in case of a dual gate structure, the gate driving unit occupies a region having a width 2×N3 in the horizontal direction.

As a result, when compared to a gate driving unit in a liquid crystal display in the related art illustrated in FIG. 2, an occupied area in the vertical direction is increased (L1<L2) but an occupied area in the horizontal direction is decreased (N1>N3) and thus the non-active area at both sides of the liquid crystal panel can be reduced, thereby implementing a narrow bezel structure.

Although many subject matters have been specifically disclosed in the foregoing description, they should be construed as an illustration of preferred embodiments rather than a limitation to the scope of invention. Consequently, the invention should not be determined by the embodiments disclosed herein but should be determined by the claims and the equivalents thereof.

What is claimed is:

1. A liquid crystal display device, comprising:
    a liquid crystal panel formed with a plurality of gate lines;
    a timing controller configured to receive a timing signal from an external system and generate a first through a fourth clock signal;
    a first gate driving unit configured to apply a gate high voltage to one side of the n–3th and n–1th gate lines (n is a natural number greater than or equal to 4) in correspondence to the first and the third clock signal;
    a second gate driving unit configured to apply the gate high voltage to one side of the n–2th and nth gate lines in correspondence to the second and the fourth clock signal;
    an L-discharge circuit configured to apply a gate low voltage to the other side of the n–2th gate line in correspondence to a voltage level of the nth gate line; and
    a R-discharge circuit configured to apply the gate low voltage to the other side of the n–3th gate line in correspondence to a voltage level of the n–1th gate line.

2. The liquid crystal display device of claim 1, wherein the first through the fourth clock signal have a high interval of two horizontal periods (2H), respectively, and one horizontal period (1H) is overlapped between front and rear signals.

3. The liquid crystal display device of claim 1, wherein the first gate driving unit comprises a plurality of L-stages connected to one another, and operated by receiving any one of the first and third clock signals, and the L-discharge circuit is formed between the plurality of L-stages.

4. The liquid crystal display device of claim 3, wherein the first gate driving unit further comprises at least one dummy L-stage connected to the R-discharge circuit.

5. The liquid crystal display device of claim 3, wherein the L-discharge circuit is a plurality of transistors comprising:
   a first electrode connected to the n−2th or nth gate line;
   a second electrode to which the gate low voltage is applied; and
   a gate electrode connected to the nth gate line or dummy line.

6. The liquid crystal display device of claim 1, wherein the second gate driving unit comprises a plurality of R-stages connected to one another, and operated by receiving any one of the second and fourth clock signals, and the R-discharge circuit is formed between the plurality of R-stages.

7. The liquid crystal display device of claim 6, wherein the second gate driving unit further comprises at least one dummy R-stage connected to the L-discharge circuit.

8. The liquid crystal display device of claim 6, wherein the R-discharge circuit is a plurality of transistors comprising:
   a first electrode connected to the n−1th or n−3th gate line;
   a second electrode to which the gate low voltage is applied; and
   a gate electrode connected to the n−1th gate line or dummy line.

9. The liquid crystal display device of claim 1, wherein the first and the second gate driving unit are embedded in the non-active area of the liquid crystal panel.

10. A liquid crystal display device, comprising:
    a liquid crystal panel formed with a plurality of gate lines;
    a timing controller configured to receive a timing signal from an external system and generate a first through a sixth clock signal;
    a first gate driving unit configured to apply a gate high voltage to one side of the n−5th, n−3th and n−1th gate lines (n is a natural number greater than or equal to 6) in correspondence to the first, the third, and the fifth clock signal;
    a second gate driving unit configured to apply the gate high voltage to one side of the n−4th, n−2th and nth gate lines in correspondence to the second, the fourth, and the sixth clock signal;
    a R-discharge circuit configured to apply a gate low voltage to the other side of the n−3th gate line in correspondence to a voltage level of the nth gate line; and
    a L-discharge circuit configured to apply the gate low voltage to the other side of the n−4th gate line in correspondence to a voltage level of the n−1th gate line.

11. The liquid crystal display device of claim 10, wherein the first through the sixth clock signal have a high interval of three horizontal periods (3H), respectively, and two horizontal periods (2H) are overlapped between front and rear signals.

12. The liquid crystal display device of claim 10, wherein the first gate driving unit comprises a plurality of L-stages connected to one another, and operated by receiving any one of the first, third and fifth clock signals, and the L-discharge circuit is formed between the plurality of L-stages.

13. The liquid crystal display device of claim 12, wherein the first gate driving unit further comprises at least one dummy L-stage connected to the R-discharge circuit.

14. The liquid crystal display device of claim 12, wherein the L-discharge circuit is a plurality of transistors comprising:
    a first electrode connected to the n−4th, n−2th or nth gate line;
    a second electrode to which the gate low voltage is applied; and
    a gate electrode connected to the n−1th gate line or dummy line.

15. The liquid crystal display device of claim 10, wherein the second gate driving unit comprises a plurality of R-stages connected to one another, and operated by receiving any one of the second, fourth and sixth clock signals, and the R-discharge circuit is formed between the plurality of R-stages.

16. The liquid crystal display device of claim 15, wherein the second gate driving unit further comprises at least one dummy R-stage connected to the L-discharge circuit.

17. The liquid crystal display device of claim 15, wherein the R-discharge circuit is a plurality of transistors comprising:
    a first electrode connected to the n−3th or n−1th gate line;
    a second electrode to which the gate low voltage is applied; and
    a gate electrode connected to the nth gate line or dummy line.

18. The liquid crystal display device of claim 10, wherein the first and the second gate driving unit are embedded in the non-active area of the liquid crystal panel.

* * * * *